(12) United States Patent
Minks

(10) Patent No.: US 12,423,552 B2
(45) Date of Patent: Sep. 23, 2025

(54) CARD ELEMENT, CHIP CARD, AND PROCESS FOR MANUFACTURING A CARD ELEMENT FOR A CHIP CARD

(71) Applicant: GIESECKE+DEVRIENT EPAYMENTS GMBH, Munich (DE)

(72) Inventor: Andreas Minks, Bad Wiessee (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/552,245

(22) PCT Filed: Mar. 23, 2022

(86) PCT No.: PCT/EP2022/025117
§ 371 (c)(1),
(2) Date: Sep. 25, 2023

(87) PCT Pub. No.: WO2022/199893
PCT Pub. Date: Sep. 29, 2022

(65) Prior Publication Data
US 2024/0160884 A1 May 16, 2024

(30) Foreign Application Priority Data
Mar. 25, 2021 (DE) .................. 10 2021 001 578.9

(51) Int. Cl.
*G06K 19/077* (2006.01)
*G06K 1/12* (2006.01)
(52) U.S. Cl.
CPC ......... *G06K 19/07749* (2013.01); *G06K 1/12* (2013.01)

(58) Field of Classification Search
CPC ....... G06K 19/07749; G06K 19/07794; G06K 19/07771; G06K 1/12
See application file for complete search history.

(56) References Cited

U.S. PATENT DOCUMENTS 10,922,601 B2  2/2021  Herslow et al.
11,030,513 B2  6/2021  Pachler et al.
(Continued)

FOREIGN PATENT DOCUMENTS

DE   102018129569 A1   5/2020
EP      3716397 A1     9/2020
(Continued)

OTHER PUBLICATIONS

International Search Report from corresponding PCT Application No. PCT/EP2022/025117, Jul. 20, 2022.
(Continued)

*Primary Examiner* — Sonji N Johnson
(74) *Attorney, Agent, or Firm* — Workman Nydegger

(57) ABSTRACT

A card element for a chip card, includes an outer metal layer with a flat surface interrupted only by a module opening for receiving a chip module. The module opening extends to an inner side and includes a ferrite layer located on the inner side and through which the opening extends. An inner metal layer is disposed on the ferrite layer through which a portion of the module opening has a reduced cross-section extends. A slit extends from a peripheral surface of the inner metal layer to the module opening and extends through the entire thickness of the inner metal layer. A final layer is made of plastic and disposed on the inner metal layer.

9 Claims, 2 Drawing Sheets

(56) References Cited

U.S. PATENT DOCUMENTS

| | | |
|---|---|---|
| 11,551,051 B2* | 1/2023 | Lotya ............... G06K 19/07747 |
| 2013/0126622 A1* | 5/2013 | Finn ...................... H05K 3/103 |
| | | 29/601 |
| 2015/0206047 A1* | 7/2015 | Herslow .................. H01Q 7/06 |
| | | 235/492 |
| 2016/0268672 A1 | 9/2016 | Liu et al. |
| 2019/0005372 A1* | 1/2019 | Virostek .......... G06K 19/07771 |
| 2020/0167628 A1 | 5/2020 | Pachler et al. |
| 2020/0250504 A1 | 8/2020 | Lotya et al. |
| 2024/0070425 A1* | 2/2024 | Lowe ............... G06Q 20/40145 |

FOREIGN PATENT DOCUMENTS

| | | |
|---|---|---|
| WO | 2014113765 A1 | 7/2014 |
| WO | 2017007468 A1 | 1/2017 |

OTHER PUBLICATIONS

German Search Report from corresponding DE Application No. 102021001578.9, Oct. 25, 2021.

* cited by examiner

CARD ELEMENT, CHIP CARD, AND PROCESS FOR MANUFACTURING A CARD ELEMENT FOR A CHIP CARD

BACKGROUND

The invention relates to a card body for a chip card, to a chip card comprising a card body and a chip module, and to a process for manufacturing a card body for a chip card.

Data carriers in the form of cards, in particular chip cards, are used in many fields, for example for making cashless payment transactions, as identification documents or as evidence of access authorizations. A chip card has a card body and, embedded in the card body, an integrated circuit, for example in the form of a chip module having a chip. The chip module is inserted into a cavity or module opening of the card body.

In the following, consideration is given to chip modules, or chip cards, having an integrated coil, which permit contactless communication. For example, chip card controllers with RFID functionality can be used.

The energy coupling of DI systems with a two coil system (SPS) takes place by means of metal superstructures having a slit, in which the magnetic flux/current flow in the metal surfaces is diverted.

The mode of functioning of such a card consists in that a chip module which itself contains a coil (coil on module) is used. This coil is coupled to the card body with a metal core. This coupling functions only when there is a slit in the metal card body. This slit is required to suppress the undesirable ring closure of the magnetic flux.

Chip cards having a metallic surface are particularly hard-wearing and are considered to be of high quality. The formation of a slit in the metallic surface is therefore disadvantageous.

Chip cards which have an outer metal layer without a slit require a further internal coil for inductive coupling in addition to the coil in the module. This is a construction which can be produced only with a high outlay.

SUMMARY

The object of the present invention is, therefore, to provide an improved construction of a card body, or of a chip card, which has an outer metal layer.

A card body according to the invention for a chip card comprises an outer metal layer having a planar surface which is interrupted only by a module opening for receiving a chip module, wherein the module opening extends to an inner side, a ferrite layer disposed on the inner side, wherein the module opening extends through the ferrite layer, an inner metal layer disposed on the ferrite layer, wherein a portion of the module opening that has a reduced cross section extends through the inner metal layer, and wherein there is provided a slit which extends from a peripheral face of the inner metal layer to the module opening and which extends through the entire thickness of the inner metal layer, and a final layer which is disposed on the inner metal layer and consists of a plastics material.

A fundamental idea of the present invention consists in that the slit that is required in the metallic layer is displaced into the card interior or to the concealed rear side, so that a planar and stable outer (front) metallic layer is made possible. The attenuations of the outer metallic layer that are negative for HF fields can be eliminated by means of the ferrite layer.

The card body proposed here thus has the advantage that a planar and stable metallic front side without a slit is created. The card is thus mechanically stable, has a high weight and can be produced in a simple manner.

It can be provided that the layers are bonded by means of an adhesive. This allows a card body or a chip card to be manufactured easily and quickly. The adhesive can be electrically insulating or non-conducting so as to avoid electrical short circuits, for example, in the region of the coil of the chip module.

It can further be provided that the final layer consists of multiple layers. This allows a chip card to be adapted to different applications, for example by means of visual features.

It can be provided that the final layer comprises an inner layer having visual features, and an overlay layer. The visual feature(s) can include security features, information and/or decorative elements. By means of one or more overlay layers, further visual effects can be achieved and the inner layer can be protected.

It can further be provided that the surface of the outer metal layer is covered with a plastics layer. The one plastics layer or further plastics layers can be used, for example, for security features in the optical, IR and/or UV range as well as for design features. Information can additionally be made available.

It can be provided that the module opening extends into the final layer. It can thus be ensured in a simple way that the module opening passes through the entirety of the inner metal layer located above the final layer. This increases the energy input into the chip module, in particular into an integrated circuit of the chip module. The performance of the chip card is thus increased.

A chip card according to the invention comprises a card body as described above and a chip module, having a coil, which is embedded in the module opening of the card body. The same advantages and modifications as described above apply.

It can be provided that the coil is arranged in a peripheral region of the module opening, wherein the peripheral region is in the form of a shoulder at the transition between the module opening and the portion of the module opening that has a reduced cross section. The chip module having the coil can be seated on and fastened to this shoulder or a step. This permits simple positioning of the chip module in the module opening.

A process according to the invention for manufacturing a card body for a chip card comprises the steps:
  providing an inner metal layer having a slit which extends from a peripheral face of the inner metal layer to a module opening region for the module opening that is subsequently to be produced and which extends through the entire thickness of the inner metal layer,
  disposing a ferrite layer on one side of the inner metal layer,
  disposing an outer metal layer on the ferrite layer,
  disposing a final layer consisting of a plastics material on a further side of the inner metal layer,
  forming a module opening for receiving a chip module in the outer metal layer and through the inner metal layer, wherein the module opening is formed with a reduced cross section in the inner metal layer.

The various steps of the process can also be carried out in different orders. Otherwise, the same advantages and modifications as described above apply.

BRIEF DESCRIPTION OF THE DRAWINGS

The present invention will be described by way of example hereinbelow with reference to the accompanying drawings, in which.

DETAILED DESCRIPTION OF VARIOUS EMBODIMENTS

Figure 1:
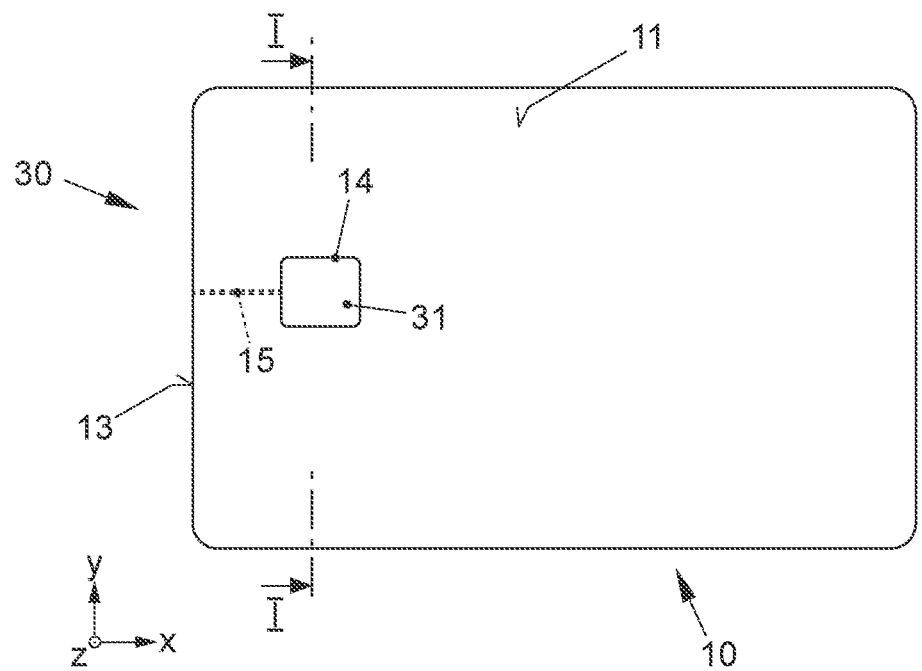
FIG. 1: shows a top view of a chip card.
Figure 2:
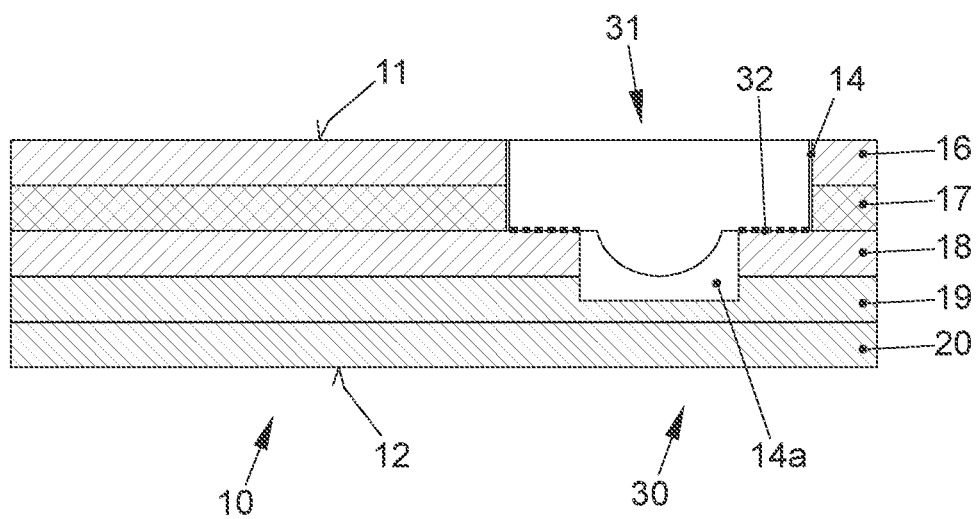
FIG. 2 shows a sectional view of the chip card from FIG. 1 along line I-I.

FIG. 1 shows a chip card 30 having a card body 10. The card body 10 has a substantially rectangular basic shape with two opposite main faces, of which one main face 11 is visible in FIG. 1. The other, opposite main face 12 is shown in FIG. 2. The two main faces 11, 12 run parallel to one another and are connected by a peripheral face 13 which extends all round.

The card body 10 has a rectangular shape in an x-y plane, in which the peripheral face 13 lies with two longitudinal faces running in the x-direction and two end faces running in the y-direction. The thickness or height of the card body 10 extends in the z-direction.

A module opening 14 for a chip module 13 has been formed in the main face 11 of the card body 10. The module opening 14 extends into the card body 10. The module opening 14 is produced, for example, by means of a laser procedure or cutting procedure. The chip module 31 has been inserted into the module opening 14 and, for example, adhesively bonded therein.

In the card body 10 there is a slit 15 which extends from the peripheral face 13, or in other words from an outer edge, of the card body 10 to the module opening 14. The slit 15 thus connects the module opening 14 to the peripheral face 13. The slit 15 runs in the y-direction, that is to say parallel to the longitudinal face. The slit 15 has, for example, a width of between 30 µm and 100 µm, preferably between 50 µm and 80 µm.

In FIG. 1, the slit 15 is shown on a left-hand side. The slit 15 may also be arranged on a right-hand, upper or lower side of the card body 10. The slit 15 serves to avoid short-circuit currents or eddy currents.

FIG. 2 shows a sectional view of the chip card 30 from FIG. 1 along line I-I. The card body 10 of the chip card 30 is a layer stack having two main faces 11 and 12, between which the individual layers are arranged preferably parallel to one another. The individual layers can be bonded or fixed together by means of adhesives, at least some of which are electrically insulating.

In the layer stack shown in FIG. 2, an outer metal layer 16 having a planar surface is provided on the top. The planar or smooth surface forms the main face 11 of the card body 10, or of the chip card 30. The surface or main face 11 is interrupted only by the module opening 14 for receiving the chip module 31. Apart from the module opening 14, there are no further openings, indentations or the like in the surface or main face 11. The module opening 14 extends to an inner side of the outer metal layer 16 which is opposite the planar surface.

On the inner side of the outer metal layer 16 there is disposed a ferrite layer 17. The ferrite layer 17 compensates for an attenuating effect of the outer metal layer 16 on the receiving and the transmission of electromagnetic fields, or HF signals. The ferrite layer 17 reflects field lines or the signals. The increased energy is then available to an antenna or coil. The ferrite layer 17 functions, as it were, as an insulating layer for HF signals, whereby the attenuation caused by the metal layer 16 can be compensated for.

The ferrite layer 17 can comprise a micro-scale iron alloy ferrite material. The ferrite layer 17 can consist of micro- or nano-particles of pure ferrite. It is likewise possible to use polymer-coated particles, which can have improved adhesion to a carrier.

The module opening 14 extends through the entire thickness or height of the ferrite layer 17 and has a cross section which is identical to that in the outer metal layer 16.

Adjacent to the ferrite layer 17 is an inner metal layer 18, which can consist of the same material, such as, for example, a V2A alloy, as the outer metal layer 16.

The module opening 14 also extends through the entire thickness or height of the inner metal layer 18. However, the portion 14a of the module opening 14 that runs in the inner metal layer 18 has a reduced cross section compared to the cross section of the module opening 14 in the outer metal layer 16 and the ferrite layer 17.

The slit 15, which is not shown in the view of FIG. 2, is provided in the inner metal layer 18. The slit 15 extends from a peripheral surface of the inner metal layer 18 to the module opening 14, or to the portion 14a of the module opening 14. The slit 15 extends through the entire thickness of the inner metal layer 18.

On the inner metal layer 18 there is disposed a final layer, which consists of one or more plastics materials or electrically non-conducting materials. The plastics material can consist, for example, of PET, PC, PVC or PP.

The final layer here consists of a printed layer such as, for example, an inner layer 19 with visual features, and an overlay layer 20.

The module opening 14 extends into the final layer. In the example shown in FIG. 2, a bottom or base surface of the module opening 14 extends into the inner layer 19. The module opening 14, or the portion 14a of the module opening 14 that runs in the inner layer 19 of the final layer, does not pass through the inner layer 19 completely, but only partially. The partial passage through the inner layer 19 is such that the module opening 14, or the portion 14a of the module opening 14 that runs in the inner metal layer 18, passes through the entirety of the inner metal layer 18, so that field lines of an electromagnetic field are able to pass in as loss-free a manner as possible.

The portion 14a of the module opening 14 that runs in the inner layer 19 of the final layer has an identical cross section compared to the cross section of the module opening 14 in the inner metal layer 18.

The chip card 30 comprises a chip module 31 which is arranged in the module opening 14 and, for example, is adhesively bonded therein. The chip module 31 comprises a coil 32. The chip module 31 further comprises a chip, which, for example, is fastened in a potting compound on an underside of a contact face structure. By way of the coil 32, the chip is supplied with energy and/or signals. Thus, an electromagnetic field leaving the inner metal layer 18 can be coupled into the coil 32. Magnetic field lines here run through the module opening 14, or through the portion 14a of the module opening 14.

The ferrite layer 17 shields the inner metal layer 18 and improves the electromagnetic properties and thus the performance of the chip card 30.

The card body 10, or the chip card 30, can have a thickness or height of, for example, approximately 920 The thickness of the card body 10 as a whole should not exceed the maximum thickness of a chip card body according to ISO 7810.

Figure 3:
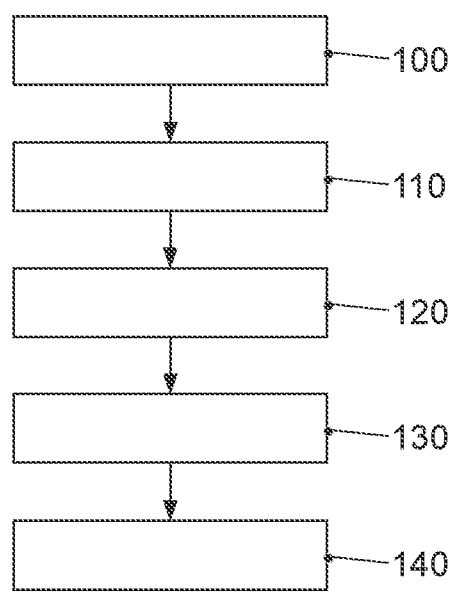
FIG. 3: shows a schematic representation of a process for manufacturing a card body.

FIG. 3 shows a schematic representation of a process for manufacturing a card body 10 for a chip card 30.

In a first step 100 there is provided the inner metal layer 18 having a slit 15 which extends from a peripheral face of the inner metal layer 18 to a module opening region for the module opening 14 that is subsequently to be produced and which extends through the entire thickness of the inner metal layer 18. The module opening 18 can already have been produced or can be produced together with the slit 15. The slit 15 can be produced, for example, by means of a laser procedure or a cutting procedure.

In a second step 110, the ferrite layer 17 is disposed on one side of the inner metal layer 18. The ferrite can be applied, for example, in a manner similar to laser-jet printing. Thus, an electrostatic charge can be applied to a rotating drum, which picks up the ferrite. The applied ferrite is applied in the desired thickness to the inner metal layer 18 and thermally bonded thereto. The adhesive bonding of a prefabricated ferrite layer 17, for example in the form of a mat, is likewise possible.

In a third step 120, the outer metal layer 16 is disposed on the ferrite layer 17. This can be effected, for example, by means of an adhesive. The ferrite layer 17 can also be attached by means of laser-jet printing as described above or by means of an adhesive first to the outer metal layer 16 and then to the inner metal layer 18.

In a fourth step 130, the final layer 19, 20 consisting of a plastics material is disposed on a further side of the inner metal layer 18. In this example, the final layer consists of a printed layer, such as, for example, an inner layer 19 with visual features, and an overlay layer 20.

In a fifth step 140, the module opening 14 for receiving the chip module 31 is formed. The module opening 14 extends from the outer metal layer 16 through the ferrite layer 17 and the inner metal layer 18 into the inner layer 19 of the final layer.

The module opening 14 is formed with a reduced cross section in the inner metal layer 18 and in the inner layer 19 of the final layer. Thus, the portion 14a of the module opening 14 that runs in the inner metal layer 18 has a reduced cross section compared to the cross section of the module opening 14 in the outer metal layer 16 and the ferrite layer 17. When producing the module opening 14, either the portion 14a on the inside having a smaller diameter or cross section can be produced first (in the layers 18 and 18), or the outer region of the module opening 14 having a larger diameter or cross section can be produced first (in the layers 16 and 17).

The various steps of the process can also be carried out in different orders. It is likewise possible to join multiple layers together in a single adhesive-bonding process.

The invention claimed is:

1. A card body for a chip card, having:
   an outer metal layer having a planar surface interrupted only by a module opening for receiving a chip module, wherein the module opening extends to an inner side of the outer metal layer,
   a ferrite layer disposed directly adjacent to the inner side of the outer metal layer, wherein the module opening extends through the ferrite layer,
   an inner metal layer disposed directly adjacent to the ferrite layer, wherein the inner metal layer and outer metal layer comprise the same material,
   wherein a portion of the module opening that has a reduced cross-section extends through the inner metal layer, and
   wherein there is provided a slit which extends from a peripheral face of the inner metal layer to the module opening and which extends through the entire thickness of the inner metal layer, and
   a final layer disposed directly adjacent to the inner metal layer and consisting of a plastic material.

2. The card body according to claim 1, wherein the layers are bonded by means of an adhesive.

3. The card body according to claim 1, wherein the final layer consists of multiple layers.

4. The card body according to claim 3, wherein the final layer comprises an inner layer having visual features and an overlay layer.

5. The card body according to claim 1, wherein the surface of the outer metal layer is covered with a plastics layer.

6. The card body according to claim 1, wherein the module opening extends into the final layer.

7. A chip card comprising a card body according to claim 1 and a chip module, having a coil embedded in the module opening of the card body.

8. The chip card according to claim 7, wherein the coil is arranged in a peripheral region of the module opening, wherein the peripheral region is in the form of a shoulder at the transition between the module opening and the portion of the module opening that has a reduced cross-section.

9. A process for manufacturing a card body for a chip card, comprising the steps:
   providing an inner metal layer having a slit extending from a peripheral face of the inner metal layer to a module opening region for the module opening that is subsequently to be produced and extends through the entire thickness of the inner metal layer,
   disposing a ferrite layer directly adjacent to one side of the inner metal layer,
   disposing an outer metal layer directly adjacent to the ferrite layer, wherein the inner metal layer and outer metal layer comprise the same material,
   disposing a final layer consisting of a plastics material directly adjacent to a further side of the inner metal layer,
   forming a module opening for receiving a chip module in the outer metal layer and through the inner metal layer, wherein the module opening is formed with a reduced cross section in the inner metal layer.

* * * * *